United States Patent
Luo

(10) Patent No.: US 7,920,598 B2
(45) Date of Patent: Apr. 5, 2011

(54) SCRAMBLING METHODS FOR SYNCHRONIZATION CHANNELS

(75) Inventor: Tao Luo, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 602 days.

(21) Appl. No.: 12/028,770

(22) Filed: Feb. 8, 2008

(65) Prior Publication Data

US 2008/0291945 A1  Nov. 27, 2008

Related U.S. Application Data

(60) Provisional application No. 60/940,354, filed on May 25, 2007.

(51) Int. Cl.
*H04J 3/06* (2006.01)
(52) U.S. Cl. .................................. 370/509; 370/350
(58) Field of Classification Search .................. 370/345, 370/350, 503, 509, 510, 511, 512, 513, 514
See application file for complete search history.

(56) References Cited

U.S. PATENT DOCUMENTS

| | | | |
|---|---|---|---|
| 6,504,830 B1 | 1/2003 | Ostberg et al. | |
| 7,206,298 B2 * | 4/2007 | New | 370/331 |
| 7,808,967 B2 * | 10/2010 | Han et al. | 370/350 |
| 2002/0021718 A1 * | 2/2002 | Kerhuel et al. | 370/509 |
| 2004/0146026 A1 * | 7/2004 | Williams et al. | 370/335 |
| 2004/0223517 A1 * | 11/2004 | Rimi et al. | 370/509 |
| 2009/0011762 A1 * | 1/2009 | Han et al. | 455/434 |
| 2009/0122839 A1 * | 5/2009 | Luo et al. | 375/145 |
| 2009/0129298 A1 * | 5/2009 | Luo et al. | 370/280 |
| 2009/0196279 A1 * | 8/2009 | Kim et al. | 370/350 |
| 2009/0219889 A1 * | 9/2009 | Schwarz et al. | 370/331 |
| 2009/0232125 A1 * | 9/2009 | Kim et al. | 370/350 |
| 2010/0110873 A1 * | 5/2010 | Han et al. | 370/208 |
| 2010/0220710 A1 * | 9/2010 | Sugawara et al. | 370/350 |

FOREIGN PATENT DOCUMENTS

WO  2008057752  5/2008

OTHER PUBLICATIONS

Tanno, et al., "Physical Channel Structures and Cell Search Method for Scalable Bandwidth for OFDM Radio Access in Evolved UTRA Downlink," IEEE Wireless Communications and Networking Conference, 2007, WCNC 2007 Mar. 11-15, 2007, pp. 1506-1511.
International Search Report—PCT/US08/064406, International Search Authority—European Patent Office, Sep. 8, 2008.
Written Opinion—PCT/US08/064406, International Search Authority—European Patent Office, Sep. 8, 2008.

* cited by examiner

*Primary Examiner* — Chi H. Pham
*Assistant Examiner* — Kevin Mew
(74) *Attorney, Agent, or Firm* — Howard Seo; Larry Moskowitz

(57) ABSTRACT

Systems and methods are provided that facilitate generation and detection of synchronization channels in a wireless communication system. A one-to-one relationship is established among a set of scrambling codes (SCs) and a set of primary synchronization channel (P-SCH) sequences which are determined by a reusable sector identifier that is determined through detection of the P-SCH channel. The set of scrambling codes are utilized to (i) scramble a secondary synchronization channel sequence which facilitates detection of the S-SCH sequence once the reusable sector identifier is detected, or (ii) compose an unscrambled S-SCH sequence through a sequential or interleaved concatenation of SCs wherein a concatenation indication is received in a mobile terminal. Cyclic shifts and sign-flip operations applied to a base sequence are employed to generate SCs. A lookup table and a library of SCs facilitate scrambling code determination in a mobile terminal that receives associated P-SCH and S-SCH sequences.

55 Claims, 10 Drawing Sheets

SCRAMBLING METHODS FOR SYNCHRONIZATION CHANNELS

CLAIM OF PRIORITY UNDER 35 U.S.C. §119

This application claims the benefit of U.S. provisional application Ser. No. 60/940,354 filed on May 25, 2007, and entitled "SCRAMBLING METHODS FOR SYNCHRONIZATION CHANNELS IN E-UTRA." The entirety of this application is incorporated herein by reference.

BACKGROUND

I. Field

The subject specification relates generally to wireless communication and, more particularly, to synchronization channel sequences generation and scrambling for efficient cell acquisition.

II. Background

Wireless communication systems are widely deployed to provide various types of communication content such as voice, video, data, and so on. These systems may be multiple-access systems capable of supporting simultaneous communication of multiple terminals with one or more base stations. Multiple-access communication relies on sharing available system resources (e.g., bandwidth and transmit power). Examples of multiple-access systems include code division multiple access (CDMA) systems, time division multiple access (TDMA) systems, frequency division multiple access (FDMA) systems, and orthogonal frequency division multiple access (OFDMA) systems.

Communication between a terminal in a wireless system (e.g., a multiple-access system) and a base station is effected through transmissions over a wireless link comprised of a forward link and a reverse link. Such communication link may be established via a single-input-single-output (SISO), multiple-input-single-output (MISO), or a multiple-input-multiple-output (MIMO) system. A MIMO system consists of transmitter(s) and receiver(s) equipped, respectively, with multiple ($N_T$) transmit antennas and multiple ($N_R$) receive antennas for data transmission. SISO and MISO systems are particular instances of a MIMO system. A MIMO channel formed by $N_T$ transmit and $N_R$ receive antennas may be decomposed into $N_V$ independent channels, which are also referred to as spatial channels, where $N_V \leq \min\{N_T, N_R\}$. Each of the $N_V$ independent channels corresponds to a dimension. The MIMO system can provide improved performance (e.g., higher throughput, greater capacity, or improved reliability) if the additional dimensionalities created by the multiple transmit and receive antennas are utilized.

Regardless the peculiarities of the many available wireless communication systems, in each of these systems a wireless device must perform cell acquisition, or cell search, in order to become operational upon switching on. Cell acquisition is the procedure by which a terminal acquires time and frequency synchronization with the network, cell identification, and additional identification of system information critical to operation, such as system bandwidth and antenna configuration of cell transmitter. It should be appreciated that subsequent to cell acquisition, a mobile terminal can continue to synchronize time and frequency for tracking purposes; e.g., to correct frequency shifts caused by various sources, such as the Doppler effect. In sectorized wireless environments, acquisition is to be conducted for each sector present in a cell.

To conduct cell or sector acquisition, wireless systems typically use pilot signals conveyed through a set of synchronization physical channels and a broadcast channel. Upon transmission of synchronization channels from a cell's or sector's base station, signals arising from disparate sectors can collide, or interfere, making the synchronization process inefficient. An inefficient synchronization process in turn can result, for example, in an accelerated battery discharge. Additionally, collision of synchronization channels can prevent a synchronization channel signal to act as a phase reference for a data channel. Therefore, there is a need in the art for synchronization channels that make the synchronization process efficient by reducing collisions and interference.

SUMMARY

The following presents a simplified summary in order to provide a basic understanding of some aspects of the disclosed embodiments. This summary is not an extensive overview and is intended to neither identify key or critical elements nor delineate the scope of such embodiments. Its purpose is to present some concepts of the described embodiments in a simplified form as a prelude to the more detailed description that is presented later.

In an aspect, a method for generating synchronization channels in a wireless communication system is described in the subject specification, the method comprising: generating a set of primary synchronization channel (P-SCH) sequences; generating an association among the generated set of primary synchronization sequences and a set of scrambling codes; generating a set of secondary synchronization channel sequences (S-SCH); and scrambling each element in the set of S-SCH sequences with the set of scrambling codes.

In another aspect, an apparatus that operates in a wireless communication system is described, the apparatus comprising: a processor configured to generate a set of primary synchronization channel (P-SCH) sequence, to generate a set of scrambling codes and associate each element in the set to an element in the set of P-SCH sequences; to generate a set of secondary synchronization channels, and to scramble at least one element in the set of S-SCH with the generated set of scrambling codes; and a memory coupled to the processor.

In yet another aspect, the subject specification sets forth a computer program product, including a computer-readable medium comprising: code for causing a computer to generate a set of primary synchronization channel (P-SCH) sequences, each element in the set of P-SCH sequences is identified with a reusable communication sector index; code for causing a computer to generate a one-to-one association among the generated set of primary synchronization sequences and a set of scrambling codes; code for causing a computer to generate a set of secondary synchronization channel sequences (S-SCH); and code for causing a computer to scramble each element in the set of S-SCH sequences with the set of scrambling codes.

In a further yet aspect, a wireless communication device is disclosed, the device comprising: means for generating a set of primary synchronization codes (PSCs), wherein each the PSCs in the set is indexed with a wireless communication reusable sector identifier; means for generating a set of scrambling codes, the set associated in a one-to-one relationship with the set of PSCs; means for generating a set of secondary synchronization codes (SSCs); means for scrambling an element in the set of SSCs with a subset of the set of scrambling codes; means for conveying an element of the set of PSCs, an element of the set of SSCs.

In addition, an aspect of the subject specification presents a method for processing synchronization channels transmitted in a wireless communication environment, the method comprising: receiving a set of primary synchronization channel (P-SCH) sequences and a set of secondary synchronization channel (S-SCH) sequences, wherein each element in the set is indexed with a sector identifier; decoding the received set of P-SCH sequences and determining the associated sector identifier; establishing a scrambling code associated with each determined sector identifier; decoding the received set of S-SCH sequences by employing the established scrambling codes to unscramble the received set of sequences.

In another aspect, a computer program product is disclosed, the computer product program including a computer-readable medium comprising: code for causing a computer to receive a set of primary synchronization channel (P-SCH) sequences and a set of secondary synchronization channel (S-SCH) sequences, wherein each element in the set of P-SCH sequences is indexed with a sector identifier; code for causing a computer to decode the received set of P-SCH sequences and determining the associated sector identifier; code for causing a computer to establish a scrambling code associated with each determined sector identifier; code for causing a computer to decode the received set of S-SCH sequences by employing the established scrambling codes to unscramble the received set of sequences.

Furthermore, in yet another aspect, the subject disclosure describes a wireless communication device comprising: a processor configured to receive a set of primary synchronization channel (P-SCH) sequences and a set of secondary synchronization channel (S-SCH) sequences, wherein each element in the set of P-SCH sequences is indexed with a sector identifier; to decode the received set of P-SCH sequences and determining the associated sector identifier; to establish a scrambling code associated with each determined sector identifier; and to decode the received set of S-SCH sequences by employing the established scrambling codes to unscramble the received set of sequences; and a memory coupled to the processor.

In a yet further aspect, the subject specification sets forth an apparatus that operates in a wireless environment, the apparatus comprising: means for receiving a set of primary synchronization codes (PSCs) and a set of secondary synchronization codes (SSCs), wherein each element in the set of PSCs is indexed with a sector identifier; means for decoding the received set of PSCs and determining the associated sector identifier; means for establishing a scrambling code associated with each determined sector identifier; means for decoding the received set of SSCs by employing the established scrambling codes to unscramble the received set of sequences; and means for storing a lookup table that facilitates to identify a scrambling code and a library of scrambling codes.

To the accomplishment of the foregoing and related ends, one or more embodiments comprise the features hereinafter fully described and particularly pointed out in the claims. The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

DETAILED DESCRIPTION

Figure 1:
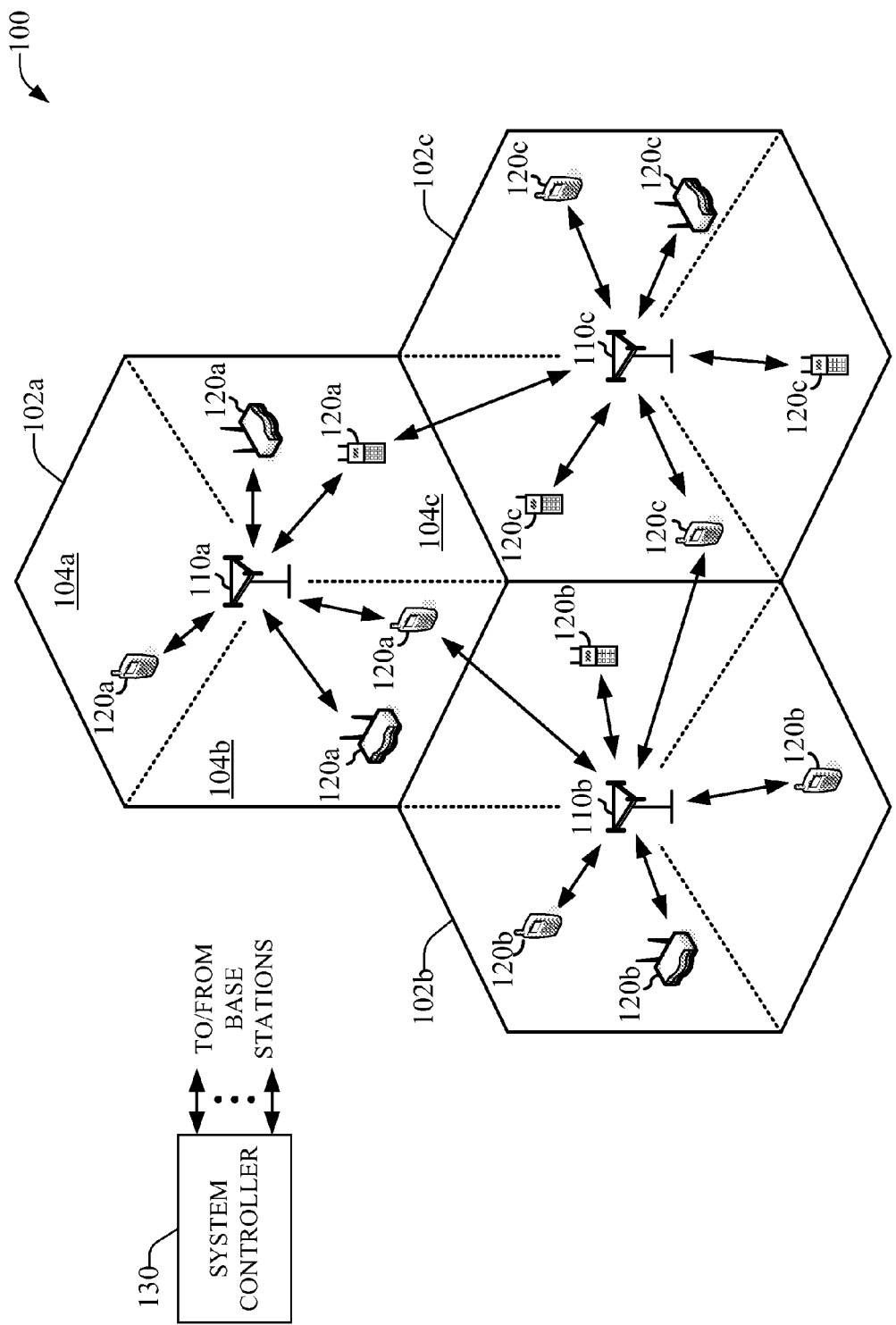
FIG. 1 illustrates an example wireless multiple-access communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "system," "component," "module," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Moreover, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Furthermore, the terms "code" and "symbol sequence," or the simpler term "sequence," are intended to convey the same notion and are employed interchangeably. It is to be noted that in the subject specification the term "code" is also utilized to indicate "computer programming code." The context of the passages of this description wherein "code" is employed conveys to one of ordinary skill in the art the intended meaning for the subject term; in instances where the context may not be sufficiently clear an explicit reference to the meaning of the term "code" is provided.

Various embodiments are described herein in connection with a wireless terminal. A wireless terminal may refer to a device providing voice and/or data connectivity to a user. A wireless terminal may be connected to a computing device such as a laptop computer or desktop computer, or it may be a self contained device such as a personal digital assistant (PDA). A wireless terminal can also be called a system, a subscriber unit, a subscriber station, a mobile station, a mobile terminal, a mobile, a remote station, an access point, a remote terminal, an access terminal, a user terminal, a user agent, a user device, customer premises equipment, or user equipment. A wireless terminal may be a subscriber station, wireless device, cellular telephone, PCS telephone, cordless telephone, a session initiation protocol (SIP) phone, a wireless local loop (WLL) station, a personal digital assistant (PDA), a handheld device having wireless connection capability, or other processing device connected to a wireless modem.

A base station may refer to a device in an access network that communicates over the air-interface, through one or more sectors, with wireless terminals, and with other base stations through backhaul network communication. The base station may act as a router between the wireless terminal and the rest of the access network, which may include an IP network, by converting received air-interface frames to IP packets. The base station also coordinates management of attributes for the air interface. Moreover, various embodiments are described herein in connection with a base station. A base station may be utilized for communicating with mobile device(s) and may also be referred to as an access point (AP), Node B, evolved Node B (eNodeB), evolved base station (eBS), access network (AN) or some other terminology.

In the subject innovation, systems and methods are provided that facilitate generation and detection of synchronization channels in a wireless communication system. A one-to-one relationship is established among a set of scrambling codes (SCs) and a set of primary synchronization channel (P-SCH) sequences which are determined by a reusable sector identifier that is determined through detection of the P-SCH channel. The set of scrambling codes are utilized to (i) scramble a secondary synchronization channel (S-SCH) sequence which facilitates its detection once the reusable sector identifier is detected, or (ii) compose an unscrambled S-SCH sequence through a sequential or interleaved concatenation of SCs wherein a concatenation indication is received in a mobile terminal. Cyclic shifts and sign-flip operations applied to a base sequence are employed to generate SCs. A lookup table and a library of SCs facilitate scrambling code determination in a mobile terminal that receives associated P-SCH and S-SCH sequences. Aspects of the innovation are discussed in details next.

Referring now to the drawings, FIG. 1 is an illustration of a wireless multiple-access communication system 100 in accordance with various aspects disclosed in the subject specification. In one example, the wireless multiple-access communication system 100 includes multiple base stations 110 and multiple terminals 120. Further, one or more base stations 110 can communicate with one or more terminals 120. By way of non-limiting example, a base station 110 can be an access point, a Node B, and/or another appropriate network entity. Each base station 110 provides communication coverage for a particular geographic area 102a-c. As used herein and generally in the art, the term "cell" can refer to a base station 110 and/or its coverage area 102a-c depending on the context in which the term is used.

To improve system capacity, the coverage area 102a, 102b, or 102c corresponding to a base station 110 can be partitioned into multiple smaller areas (e.g., areas 104a, 104b, and 104c). Each of the smaller areas 104a, 104b, and 104c can be served by a respective base transceiver subsystem (BTS, not shown). As used herein and generally in the art, the term "sector" can refer to a BTS and/or its coverage area depending on the context in which the term is used. As an example, sectors 104a, 104b, 104c in cell 102a (or cells 102b and 102c) can be formed by groups of antennas (not shown) at base station 110, where each group of antennas is responsible for communication with terminals 120 in a portion of cell 102a, 102b, or 102c. Such utilization of a specific group of antennas is known as beamforming, wherein multiple antennas are employed to transmit a signal in a directed, localized pattern. For example, base station 110 serving cell 102a can have a first antenna group corresponding to sector 104a, a second antenna group corresponding to sector 104b, and a third antenna group corresponding to sector 104c. In an aspect, each sector 104a, 104b, and 104c in sectorized cell 102a (or cells 102b and 102c) can have a sector identifier. Such an identifier can be acquired during cell search. It should be appreciated that the various aspects described herein can be used in a system having sectorized or unsectorized cells. Furthermore, all suitable wireless communication networks having substantially any number of sectorized or unsectorized cells are intended to fall within the scope of the hereto appended claims. For simplicity, the term "base station" (or other terminology that indicates "base station") as employed herein can refer both to a station that serves a sector as well as a station that serves a cell. While the following description generally relates to a system in which each terminal communicates with one serving access point for simplicity, it should be appreciated that terminals can communicate with any number of serving access points.

In accordance with one aspect, terminals 120 can be dispersed throughout the system 100. Each terminal 120 can be stationary or mobile. By way of non-limiting example, a terminal 120 can be an access terminal (AT), a mobile station, user equipment, a subscriber station, and/or another appropriate network entity. A terminal 120 can be a wireless device, a cellular phone, a personal digital assistant (PDA), a wireless modem, a handheld device, or another appropriate device. Further, a terminal 120 can communicate with any number of base stations 110 or no base stations 110 at any given moment.

In another example, the system 100 can utilize a centralized architecture by employing a system controller 130 that can be coupled to one or more base stations 110 and provide coordination and control for the base stations 110. In accordance with alternative aspects, system controller 130 can be a single network entity or a collection of network entities. Additionally, the system 100 can utilize a distributed architecture to allow the base stations 110 to communicate with each other as needed. In one example, system controller 130 can additionally contain one or more connections to multiple networks. These networks can include the Internet, other packet based networks, and/or circuit switched voice networks that can provide information to and/or from terminals 120 in communication with one or more base stations 110 in system 100. In another example, system controller 130 can include or be coupled with a scheduler (not shown) that can schedule transmissions to and/or from terminals 120. Alternatively, the scheduler can reside in each individual cell 102, each sector 104, or a combination thereof.

In an example, system 100 can utilize one or more multiple-access schemes, such as CDMA, TDMA, FDMA, OFDMA, Single-Carrier FDMA (SC-FDMA), and/or other suitable multiple-access schemes. TDMA utilizes time division multiplexing (TDM), wherein transmissions for different terminals 120 are orthogonalized by transmitting in different time intervals. FDMA utilizes frequency division multiplexing (FDM), wherein transmissions for different terminals 120 are orthogonalized by transmitting in different frequency subcarriers. In one example, TDMA and FDMA systems can also use code division multiplexing (CDM), wherein transmissions for multiple terminals can be orthogonalized using different orthogonal codes (e.g., Walsh codes) even though they are sent in the same time interval or frequency sub-carrier. OFDMA utilizes Orthogonal Frequency Division Multiplexing (OFDM), and SC-FDMA utilizes Single-Carrier Frequency Division Multiplexing (SC-FDM). OFDM and SC-FDM can partition the system bandwidth into multiple orthogonal subcarriers (e.g., tones, bins, . . . ), each of which can be modulated with data. Typically, modulation symbols are sent in the frequency domain with OFDM and in the time domain with SC-FDM. Additionally and/or alternatively, the system bandwidth can be divided into one or more frequency carriers, each of which can contain one or more subcarriers. System 100 can also utilize a combination of multiple-access schemes, such as OFDMA and CDMA. While the power control techniques provided herein are generally described for an OFDMA system, it should be appreciated that the techniques described herein can similarly be applied to any wireless communication system.

In another example, base stations 110 and terminals 120 in system 100 can communicate data using one or more data channels and signaling using one or more control channels. Data channels utilized by system 100 can be assigned to active terminals 120 such that each data channel is used by only one terminal at any given time. Alternatively, data channels can be assigned to multiple terminals 120, which can be superimposed or orthogonally scheduled on a data channel. To conserve system resources, control channels utilized by system 100 can also be shared among multiple terminals 120 using, for example, code division multiplexing. In one example, data channels orthogonally multiplexed only in frequency and time (e.g., data channels not multiplexed using CDM) can be less susceptible to loss in orthogonality due to channel conditions and receiver imperfections than corresponding control channels.

In accordance with an aspect, system 100 can employ centralized scheduling via one or more schedulers implemented at, for example, system controller 130 and/or each base station 110. In a system utilizing centralized scheduling, scheduler(s) can rely on feedback from terminals 120 to make appropriate scheduling decisions. As an example, such feedback can include an offset added to receive other sector interference information in order to allow the scheduler to estimate a supportable reverse link peak rate for a terminal 120, from which such feedback is received, and to allocate system bandwidth accordingly.

Figure 2:
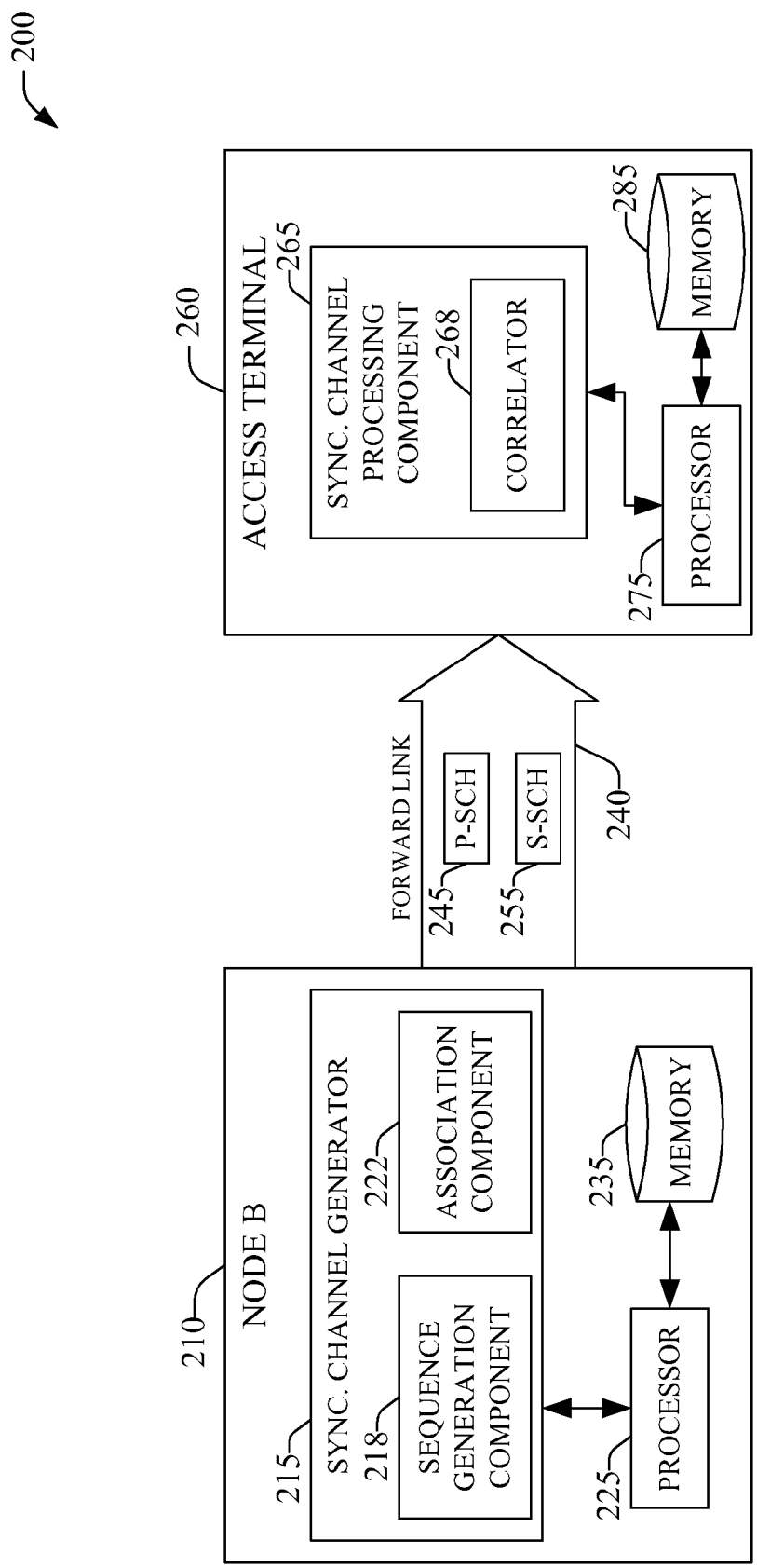
FIG. 2 is a block diagram of an example system that generates, communicates, and processes a set of synchronization channel according to aspects described in the subject specification.

FIG. 2 is a block diagram of a system 200 that generates, communicates, and processes a set of synchronization channel which can facilitate determination of operational parameters of a wireless system and coherent detection of data communications. Node B 210 can generate a set of synchronization channel signals, or acquisition pilots, through synchronization channel generator 215. Such synchronization sequences, e.g., a primary synchronization channel (P-SCH) and a secondary synchronization channel (S-SCH), can be employed for cell/sector acquisition and are transmitted over a forward link (FL) 240 of a wireless system to an access terminal 260 that processes them via a synchronization channel processing component 265. Once the access terminal 260 decodes the acquisition pilots, operational parameters of the wireless system become available; namely, (i) system bandwidth, characterized by a FFT size in the case of a FDMA system; (ii) perforation profile in the case of perforated spectrum allocation; (iii) indication of time division duplex (TDD) or frequency division duplex (FDD), with further indication of specific TDD partitioning and FDD half duplex (the latter further carries an indication of time guard intervals as well as frequency-domain guard interval for forward link and reverse link); (iv) cyclic prefix length; (v) indication of synchronous or asynchronous operation; (vi) frequency reuse; (vii) cell/sector identification index, or cell/sector identifier; and (viii) antenna configuration at base station (e.g., Node B 210), and so on. In addition, it should be appreciated that a received synchronization sequence can be employed as a phase reference for coherent detection of a received data channel.

In accordance with an aspect of synchronization channel generator 215, a sequence generation component 218 can generate a length-L (with L a positive integer) sequence of bits or complex symbols that can contain at least a portion of the cell/sector search information (i)-(viii). Sequences can be pseudorandom codes or pseudonoise sequences, a Gold sequence, a Walsh-Hadamard sequence, an exponential sequence, a Golomb sequence, a Rice sequence, an M-sequence, or a generalized Chirp-like (GCL) sequence (e.g., Zadoff-Chu sequence). A generated sequence can be employed to scramble a data or control channel. In another aspect, an association component 222 can concatenate two or more generated sequences (concatenation can be implemented in a sequential or in an interleaved arrangement) to form a synchronization channel signal such as P-SCH or S-SCH. Sequences associated with such synchronization channels can be identified as a primary synchronization code ({PSC}) for P-SCH, or a secondary synchronization code ({SSC}) for S-SCH. Sequence generation component 218 typically generates a pilot sequence according to the specification of the wireless system in which communication takes place. As an example, in E-UTRA (evolved universal terrestrial radio access) the P-SCH signal corresponds to a sequential concatenation of two 31-bit frequency-domain Zhadoff-Chu sequences specified by one of three physical-layer identity indicators, and S-SCH is an interleaved concatenation of two 31-bit sequences that is scrambled prior to modulation.

In yet another aspect of synchronization channel generator 215, association component 222 can link a PSC to a sector or cell identifier, which can be reusable throughout multiple cells in the wireless system, and can generate an association table which entries comprise a lookup table that can be indicated, or conveyed, to a mobile station like access terminal 260 via a forward link (e.g., FL 240). It should be noted that each primary synchronization code in a sectorized cell served by a base station (e.g., Node B 210) can be linked to a sector identifier; for example, in E-UTRA a root index that determines each of the Zhadoff-Chu sequences that comprise a PSC depends on the physical-layer index, which can adopt a value of 0, 1, or 2.

It is to be noted that sequence generation component 215 can employ processor 225 to perform a portion of sequence generation and association, such as pseudorandom number generation, matrix manipulation involved in construction Walsh-Hadamard sequences, generation of GCL sequences, determination of cell/sector identifiers, generation of a concatenation indication, as well as initializing registers and storing generated sequences and updated counter values in a memory 225. Furthermore, processor 225 can perform data manipulation necessary to communicate a sequence, as well as control and data channels. In an aspect, in an FDMA wireless system, processor 225 can perform direct/inverse Fourier transformations (D/IFT)—necessary for mapping a sequence into a frequency-time resource block prior to communication—Hadamard transformation, addition of cyclic prefixes to a sequence, modulation of control and data streams, as well as serial-to-parallel/parallel-to-serial manipulations. In a CDMA wireless system (e.g., ultra-mobile broadband), scrambling of symbols in a control sequence or traffic sequence can be executed by processor 222. It should be appreciated that processor 222 can perform other actions related to communication of node B 210 with access terminal 260, such additional actions would be readily apparent to one of ordinary skill.

Memory 225 can store code instructions/modules employed to generate sequences and association of sequences with cell/sector identification indices, as well as code instructions for operations necessary to manipulate and transmit such sequences, control and data over forward link 240.

In connection with access terminal 260, a synchronization channel processing component 265 detects and decodes (or demodulates) synchronization channel signals. In an aspect, bits or complex symbols, either scrambled or unscrambled, that have been transmitted in P-SCH 245 or S-SCH 255 by node B 210 through FL 240 upon generation of a sequence based upon an orthogonal code (e.g., Walsh-Hadamard, exponential, or the like) or non-orthogonal code, are decoded by correlating with each of the appropriate orthogonal or non-orthogonal sequences (e.g., code hypotheses). Detection of P-SCH (or demodulation of PSC) can lead to determination of timing information, such as slot duration or cyclic prefix. In addition, detection of PSC can result in determination of information linked with PSC like a cell/sector identifier. It is to be noted that code hypotheses determined by specific cell/sector identifiers are employed for correlation in order to identify an adequate cell/sector index. It should be appreciated that efficient detection of PSC or SSC generally can be accomplished by employing a Hadamard transformation for Walsh-Hadamard sequences, and a fast Fourier transformation for exponential sequences.

As a part of synchronization channel acquisition, a component, correlator 248, correlates (temporally) disparate sequences to extract timing information (e.g., superframe, frame and symbol boundary detection), frequency synchronization, and other system information such as cell/sector identifiers. Correlator 248 relies on processor 232 to perform temporal correlation as well as other operations such as inverse FFT (IFFT). Timing and frequency synchronization methods such as Moose method, Van De Beenk method, and Schmidl method, propose particular code sequences with repeated sections of the transmitted bit series or complex symbol series (e.g., PSC or SSC) to estimate frame and subframe boundaries, as well as frequency offset. Other methods also can be used for time correlation, superframe, frame, and symbol boundary detection; CP duration; and frequency synchronization. After timing and frequency synchronization, code sequences that carry full cell/sector identity and system information (e.g., bandwidth, TDD/FDD operation, frequency reuse) can be demodulated by access terminal 260.

Decoding at synchronization channel processing component 265 can involve descrambling a pilot sequence or a data sequence that have been transmitted by employing a specific scrambling code. Such decoding can be accomplished by utilizing the particular scrambling sequence(s) that a sequence generation component (e.g., component 215) employed to generate a received pilot sequence (e.g., S-SCH 255). In an aspect, in order to exploit association established by association component 222 among PSC and a scrambling code, a cell/sector identifier extracted from a decoded P-SCH can be utilized as a key to identify a scrambling code in a lookup table that can reside in component 265 or in memory 285, and subsequently extract the identified scrambling sequence from a library of scrambling codes. Alternatively, a component (not shown) can generate the adequate scrambling sequence according to the detected cell/sector indicator. In another aspect, synchronization channel processing component 265 can employ a received indication (e.g., one or more bits in a control channel) to concatenate linked/associated codes in a predetermined manner; for instance, a sequential concatenation of two or more short scrambling sequences, or an interleaved concatenation. In a further aspect, associated scrambling sequences can be concatenated in order to generate an S-SCH signal. It is to be noted that a processing overhead incurred by receiving (e.g., decoding) a concatenation indication can be offset by reduced complexity in decoding a received SSC.

It is noted that synchronization channel processing component 265 can employ a decoded synchronization channel signal (e.g., P-SCH 245 or S-SCH 255) a reference signal in coherent detection of a data channel. In such a scenario, a matched filter and additional circuitry (not shown) can be a part of component 265.

Figure 3:
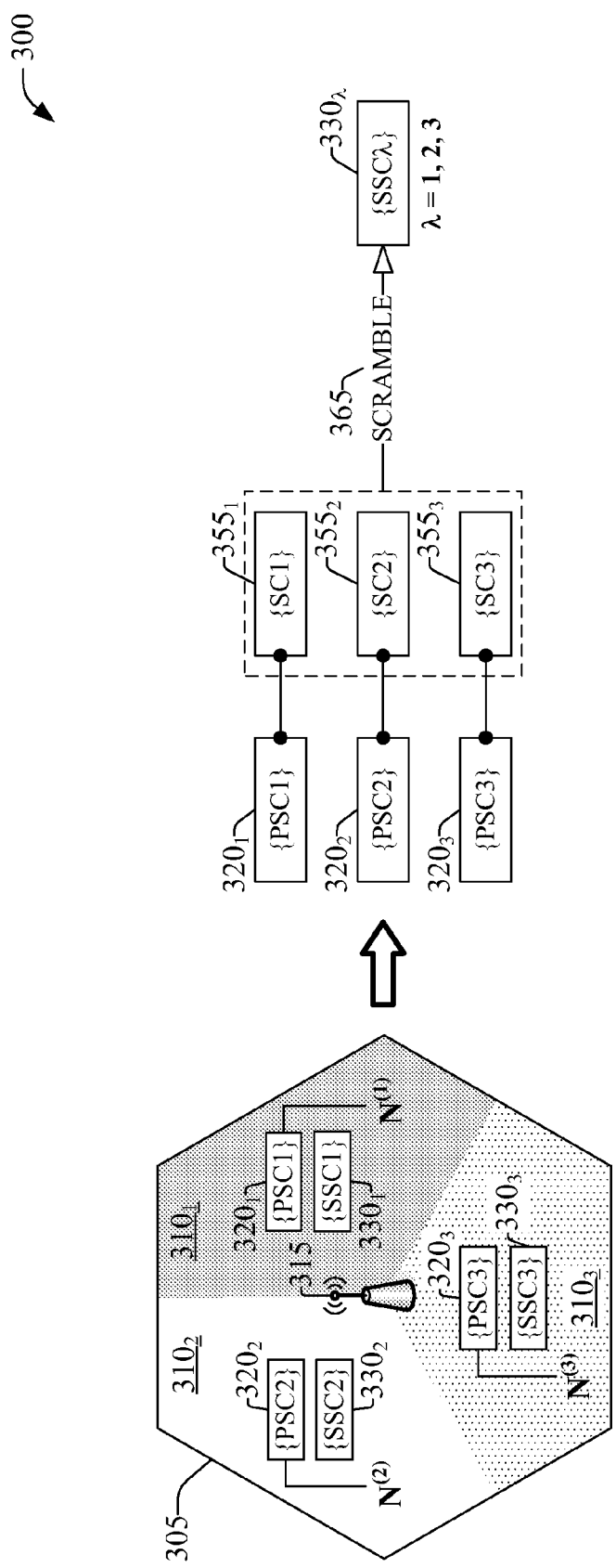
FIG. 3 is a diagram of an example mapping between a set of primary synchronization sequences and a set of scrambling codes for a secondary synchronization sequence.

FIG. 3 is a diagram 300 of an example mapping between a set of primary synchronization sequences and a set of scrambling codes for a secondary synchronization sequence. Wireless communication cell 305 is a sectorized cell wherein three sectors $310_1$, $310_2$, and $310_3$ are served by base station 315. (Cell 305 is illustrated as hexagonal even though other geometries can be deployed; typically cell geometry is dictated by the landscape of the coverage area and the nature of a wireless communication system). As diagram 300 depicts, each sector $310_\lambda$ possesses a sector identifier $N^{(\lambda)}$ ($\lambda=1, 2, 3$) which can be reusable, e.g., each first sector in a cell can employ a common first identifier throughout each communication cell in a cellular wireless environment, each second sector in a cell can employ a common second identifier, and so on. Sector $310_1$ has associated a $\{PSC1\}$ $320_1$, linked to identifier $N^{(1)}$, and a $\{SSC1\}$ $330_1$; sector $310_2$ possesses a $\{PSC2\}$ $320_2$, linked to $N^{(2)}$, and a $\{SSC2\}$ $330_2$; and sector $310_3$ has a $\{PSC3\}$ $320_3$, linked to $N^{(3)}$, and a $\{SSC3\}$ $330_3$. It should be appreciated that the specific manner in which a primary synchronization sequence in a sector is linked to a sector identifier can be determined, as mentioned above in connection with a discussion of FIG. 2. For the set {{PSC1} $320_1$, {PSC2} $320_2$, {PSC3} $320_3$} of primary synchronization sequences, a one-to-one association is established with a set of scrambling codes ({SC}s), with elements {SC1} $355_1$, {SC2} $355_2$, {SC3} $355_3$. In an aspect, the set of scrambling codes {{SC1} $355_1$, {SC2} $355_2$, {SC3} $355_3$} is employed to scramble 365 each of the secondary synchronization codes {SSCλ} $320_λ$. In an alternative or additional aspect, a set of three short sequences {S1}$_N$, {S2}$_M$ and {S3}$_P$ associated with {PSC1} $320_1$, {PSC2} $320_2$, and {PSC3} $320_3$ can be concatenated to generate a set of {SSCλ} $320_λ$ for a set of S-SCH signals. Therefore, at least one of the advantages of the one-to-one association between {SC}s (or alternatively {S}s) and {PSC}s is that once a set of primary synchronization sequences is received by a mobile station (e.g., access terminal 260) and decoded, the set of associated scrambling codes is determined and thus a secondary synchronization sequence can be readily decoded at the mobile station. It is noted that the reuse factor of the scrambling codes (or alternatively short sequences) is determined by the reuse factor of the sector identifiers. It is to be noted that a scrambling sequence, e.g., {SC1} $355_1$, {SC2} $355_2$, or {SC3} $355_3$, or alternatively {S1}, {S2}, or {S3}, can be substantially any sequence that is known to one of ordinary skill in the art. For example, a sequence can be a pseudorandom code or pseudonoise sequence, a Gold sequence, a Walsh-Hadamard sequence, an exponential sequence, a Golomb sequence, a Rice sequence, an M-sequence, or a generalized Chirp-like (GCL) sequence (e.g., Zadoff-Chu sequence).

It should be appreciated that cell 305 generally can be sectorized in M sectors (M≧1), and a corresponding set of M scrambling codes, or alternatively short sequences, can be associated with each member of a set of sector identifiers $N^{(λ)}$ (λ=1, 2, . . . , M−1, M). Illustrative structures of SSCs are discussed next.

Figure 4:
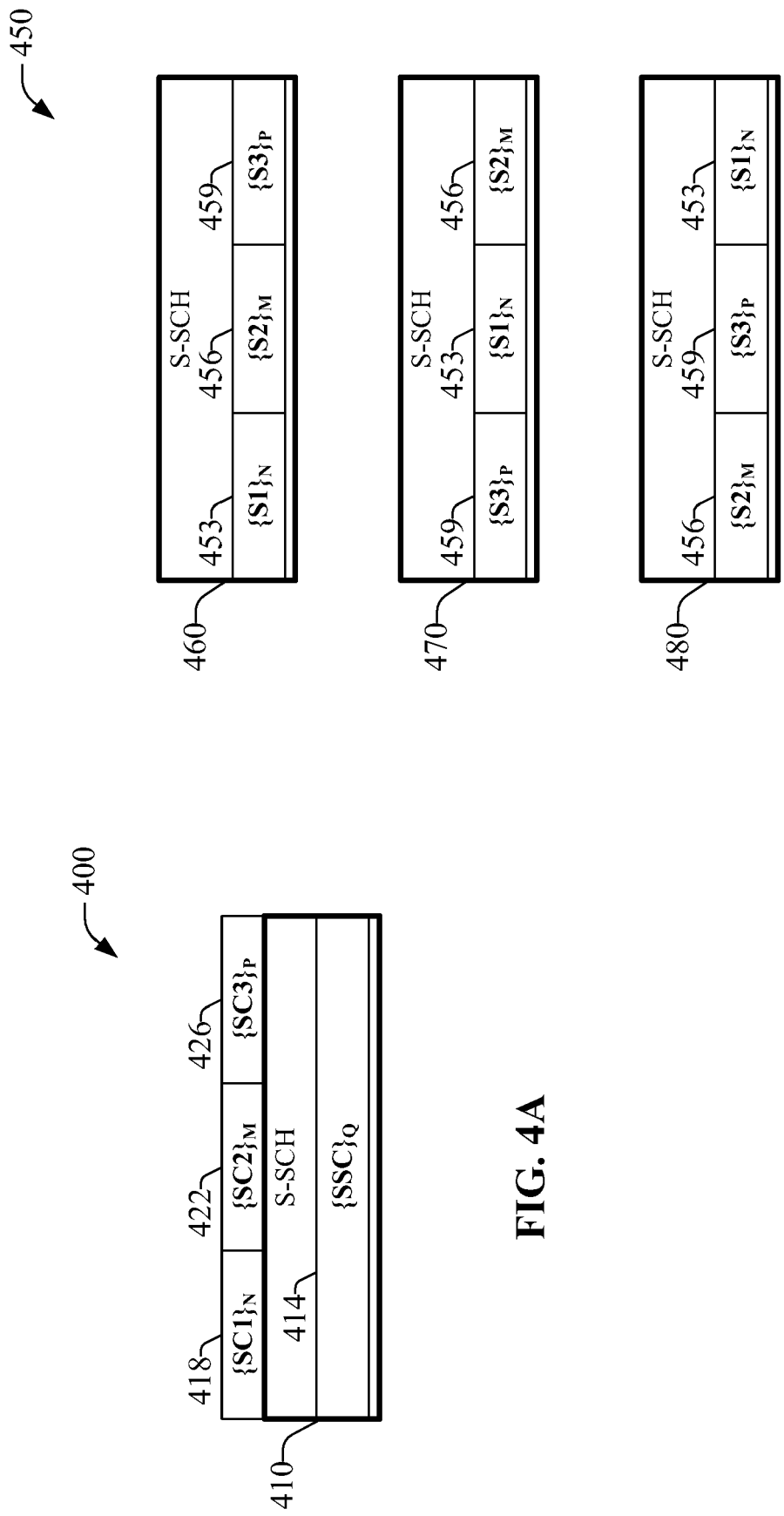
FIGS. 4A and 4B illustrate, respectively, an example S-SCH scrambled sequence and multiple example S-SCH sequences generated through cyclic shift of three concatenated sequences.

FIGS. 4A and 4B illustrate, respectively, a diagram 400 of an example S-SCH scrambled sequence and diagrams 450 of multiple example S-SCH sequences generated through cyclic shift of three concatenated sequences. Diagram 400 depicts a S-SCH 410 that conveys a Q-symbol secondary synchronization code {SSC}$_Q$ 414 which is scrambled with three sequences: an N-symbol sequence {SC1}$_N$ 418, an M-symbol sequence {SC2}$_M$ 422, and a P-symbol sequence {SC3}$_P$ 426, where N+M+P=Q. As indicated above, in a E-UTRA system, {SSC}$_Q$ 414 can be an interleaved concatenation of two 31-bit sequences. It should be noted that scrambling of {SSC}$_Q$ 414 occurs prior to modulation thereof. In diagram 400 a set of more than three scrambling sequences can be utilized for scrambling {SSC}$_Q$ 414. In an aspect, the number of scrambling sequences that can be employed to scramble {SSC}$_Q$ can equal the number of sectors present in a communication cell. In should be appreciated that each scrambling sequence (e.g., {SC}$_α$ (α=N, M, P)) that is concatenated and employed to scramble {SSC} posses a 1-to-1 relationship with each P-SCH sequence ({PSC}$_β$, β=1, 2, 3). It should be appreciated that {SSC} 410 can be employed for each S-SCH in a three-sector cell (e.g., cell 305); in a cell with additional sectors, S-SCH signal 410 can be scrambled with additional scrambling codes each associated with each additional sector.

Diagram 450 in FIG. 4B illustrates an additional, or alternative, class of secondary synchronization channel signals: Sequences, e.g., short sequences, {S1}$_N$ 453, {S2}$_M$ 456, and {S3}$_P$ 459 can be concatenated to form a S-SCH Q-symbol sequence to which no scrambling is applied. As illustrated in diagram 450, the three sequences {S1}$_N$ 453, {S2}$_M$ 456, and {S3}$_P$ 459 can be cyclically shifted prior to sequential concatenation in order to generate S-SCH signals 460, 470, and 480. It should be appreciated that multiple sets of three S-SCH signals also can be generated when the sequences {S1}$_N$ 453, {S2}$_M$ 456, and {S3}$_P$ 459 are concatenated in an interleaved arrangement. The unique character of sequences {S1}$_N$ 453, {S2}$_M$ 456, and {S3}$_P$ 459, in view of their association with {PSCλ} affords the absence of scrambling applied to S-SCH.

Figure 5:
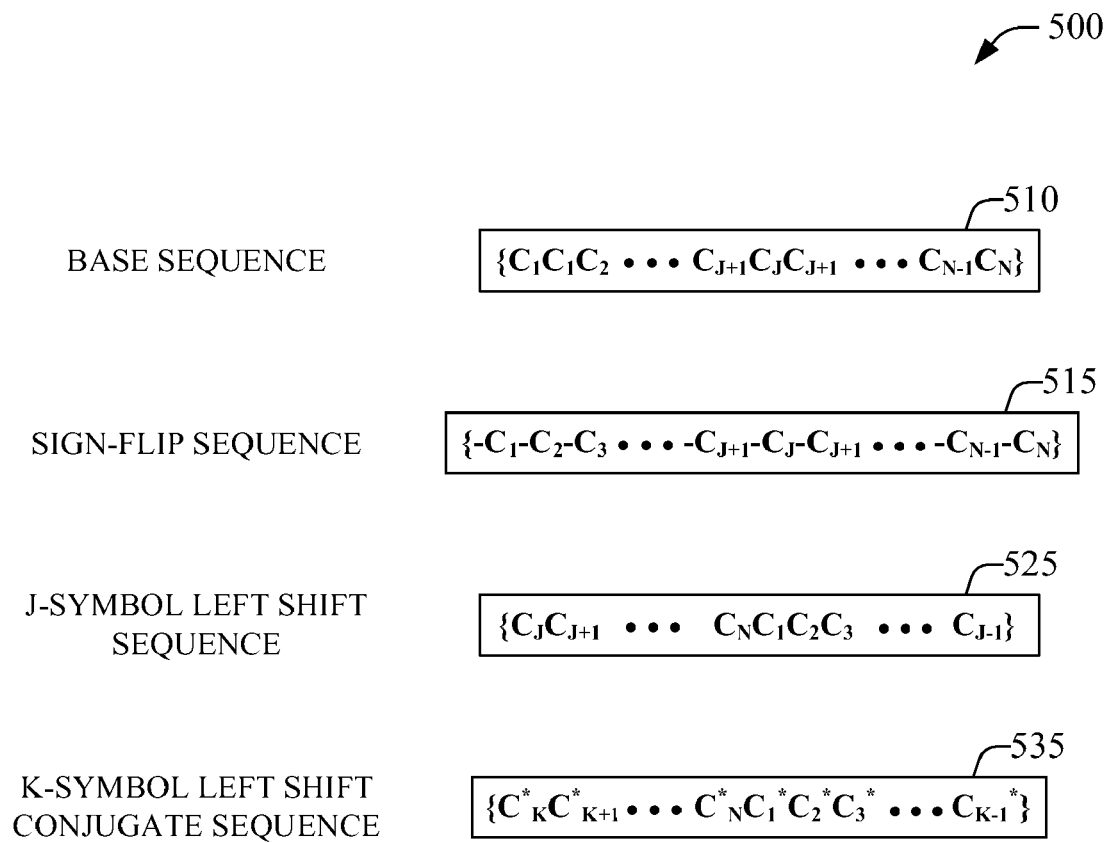
FIG. 5 presents a diagram of example sequence structures generated from a base sequence according to an aspect of the subject specification.

FIG. 5 presents a diagram 500 of example sequence structures generated from a base sequence (e.g., a base scramble sequence or a short sequence) and that can be employed in a secondary synchronization channel. Base sequence 510 is an N-symbol base sequence that is linked to a PSC sequence. As mentioned above, symbols $C_1$-$C_{N-1}$ can be binary symbols or complex symbols generated according a specific coding. From base sequence 510, a sign-flip operation results in sequence $\{-C_1, -C_2, -C_3, \ldots, -C_{J+1}, -C_J, -C_{J+1}, \ldots, -C_{N-1}, -C_N\}$ 520. A sign-flip operation is equivalent to a p phase-shift of each sequence element. It should be appreciated that in a binary sequence a sign-flip operation can be interpreted as a bit swap operation; e.g., 1↔0. It should be appreciated that a sign-flip, or bit-swap, operation can leave unchanged the autocorrelation properties of the base sequence 510. An additional or alternative operation that can be applied to the base sequence 510 is a shift operation. Sequence 530 is a J-symbol (J≦N) left-shifted sequence. In turn, sequence 540 arises from a K-symbol (K≦N) shift complex-conjugate operation: $\{C^*_K, C^*_{K+1}, \ldots, C^*_N, C^*_1, C^*_2, \ldots, C^*_{K-1}\}$ It is noted that a shift complex-conjugate operation leaves a binary sequence unchanged. Right-shifted sequences are intended to be within the scope of the claimed subject matter. In an aspect, it is to be noted that base sequence $\{C_1, C_2, C_3, \ldots, C_{J+1}, C_J, C_{J+1}, \ldots, C_{N-1}, C_N\}$ 510 can posses complex symbols as a result of modulation of an initial binary base sequence. Modulation schemes can include phase shift keying (e.g., BPSK (binary), QPSK (quadrature), and MPSK (M-ary) with M>4), quadrature amplitude modulation (e.g., MQAM (M-ary)), and asymmetric (amplitude and phase) shift keying (M-ary APSK, with M=16 or 32 for example, even though other M orders are contemplated).

Figures 6A, 6B:
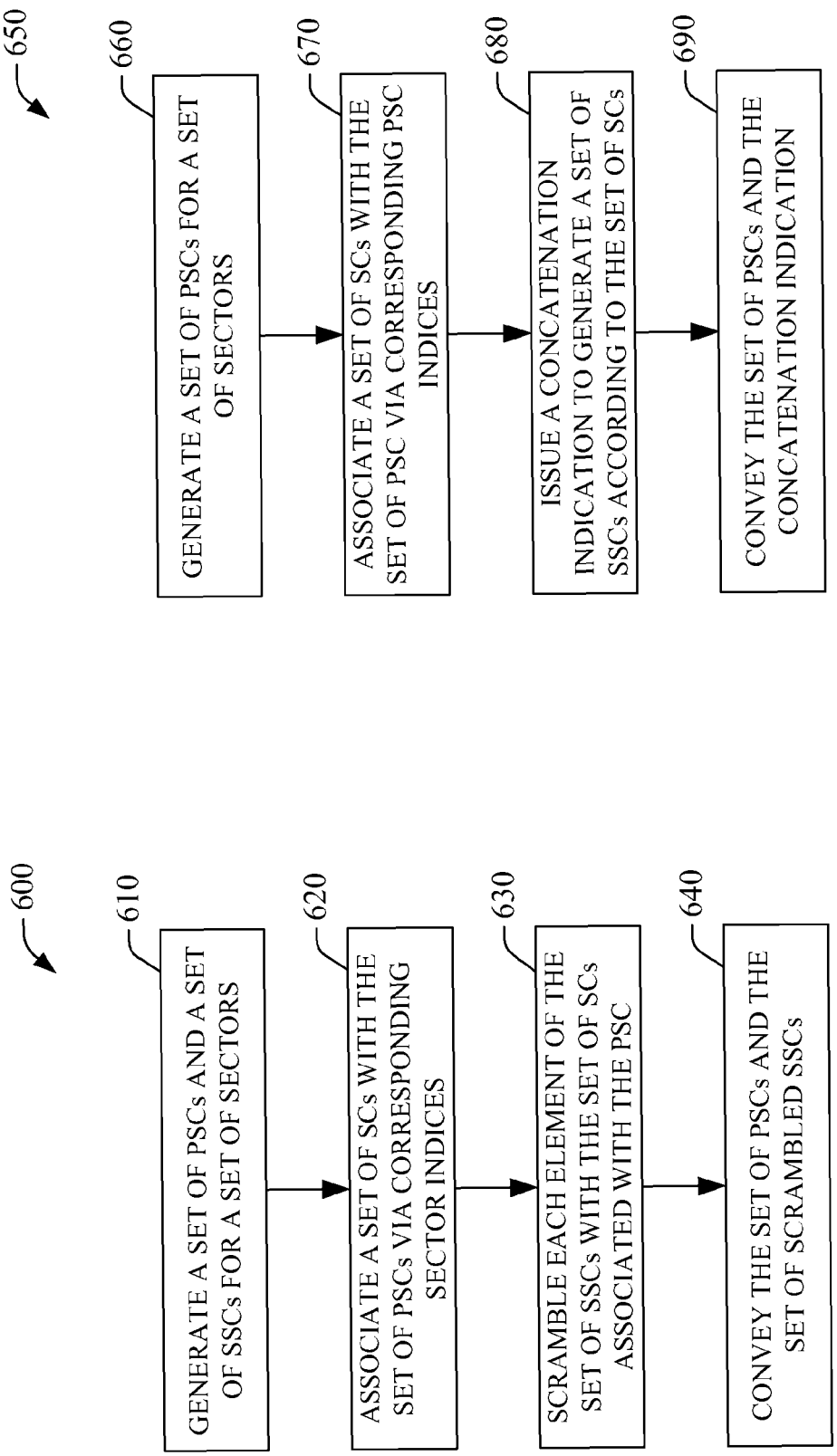
FIGS. 6A and 6B present flowcharts of example methodologies for generating and conveying a P-SCH sequence, an S-SCH sequence, and a concatenation indication according to aspects set forth in the subject specification.
Figures 7A, 7B:
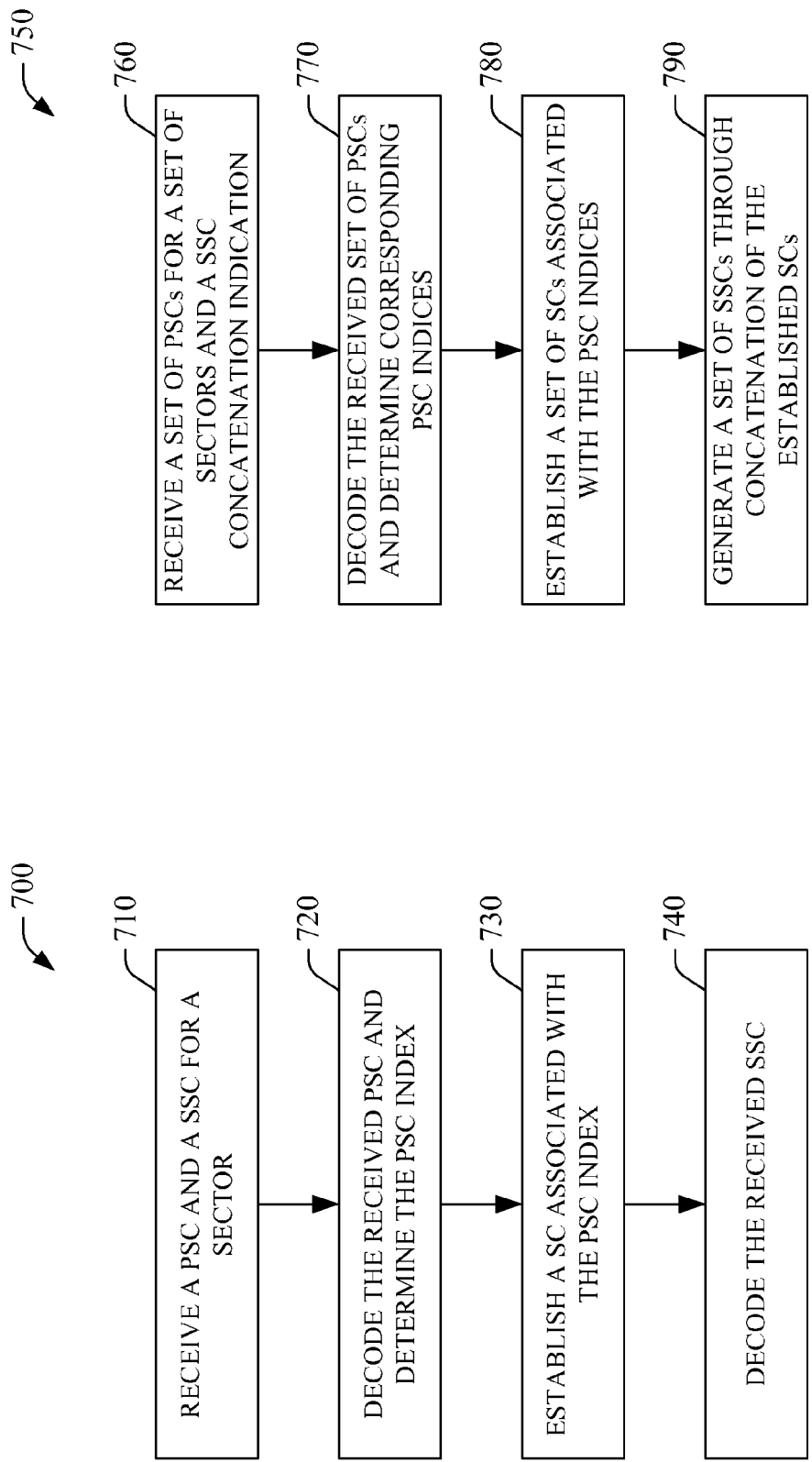
FIGS. 7A and 7B present flowcharts of example methodologies for processing received P-SCH and S-SCH sequences, as well as scrambling codes according to aspects disclosed herein.

In view of the example systems presented and described above, methodologies for inter-cell power controls that may be implemented in accordance with the disclosed subject matter will be better appreciated with reference to the flowcharts of FIGS. 6A and B, and FIGS. 7A and 7B. While, for purposes of simplicity of explanation, the methodologies are shown and described as a series of blocks, it is to be understood and appreciated that the claimed subject matter is not limited by the number or order of blocks, as some blocks may occur in different orders and/or concurrently with other blocks from what is depicted and described herein. Moreover, not all illustrated blocks may be required to implement the methodologies described hereinafter. It is to be appreciated that the functionality associated with the blocks may be implemented by software, hardware, a combination thereof or any other suitable means (e.g., device, system, process, component, . . . ). Additionally, it should be further appreciated that the methodologies disclosed hereinafter and throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

FIGS. 6A and 6B present flowcharts of example methodologies for generating and conveying a P-SCH sequence and a S-SCH sequence, and a P-SCH and a concatenation indication, respectively. In methodology 600, at act 610 a set of primary synchronization codes (PSCs) and a set of secondary synchronization codes (SSCs) can be generated for a set of sector in a sectorized wireless communication cell. The number of elements in each of the generated sets depends on the number of sectors in the cell. In an aspect, PSCs codes can be determined unambiguously by a sector identification index, wherein such an index and a reusable element with reuse factor equal to one; e.g., each sector possesses the same index for each cell in the wireless communication system. SSCs also can be associated with the sector identifier. Generation of PSCs and SSCs can be effected by a synchronization channel generation component (e.g., component 215), and each generated code can be a binary code series or a complex symbol series as known in the art; e.g., pseudorandom codes or pseudonoise sequences, a Gold sequence, a Walsh-Hadamard sequence, an exponential sequence, a Golomb sequence, a Rice sequence, an M-sequence, or a generalized Chirp-like (GCL) sequence (e.g., Zadoff-Chu sequence). At act 620, a set of scrambling codes is associated with the set of PSCs according through corresponding sector indices. As an example, in E-UTRA a communication can be split in three sectors with identifier indices $N^{(i)}=0, 1, 2$, wherein each index determines a Zhadoff-Chu PSC for each sector. Scrambling codes can be generated by the same component that generates synchronization channel sequences. At act 630, each SSC in the set of generated sequences is scrambled with a sequence containing all elements in the set of scrambling codes associated with the generated PSCs (e.g., see diagram 400 for a three-sequence set). At act 640, the set of primary synchronization sequences and the set of scrambled secondary synchronization sequences are conveyed. Conveying such sequences can involve mapping the sequence symbols to a frequency-time resources block, as it would be the case in an E-UTRA wireless system.

In connection with methodology 650 (FIG. 6B), at act 660 a set of PSCs is generated for a set of sectors. Such an act is substantially the same as act 610 in example method 600. Similarly, act 670 comprises associating a set of SCs with the set of primary synchronization sequences via corresponding sector identifier indices in substantially the same manner as in act 620. In act 680, a concatenation indication can be issued to indicate that a set of secondary synchronization channels is to be generated by concatenation of the scrambling codes associated with the set of PSCs. Such a concatenation can be sequential (see diagram 450 for an illustration) or interleaved. At act 690, the generated set of PSCs and the concatenation indication can be conveyed according to modulation and multiplexing procedures corresponding to the wireless system in which the communication takes place.

FIGS. 7A and 7B present flowcharts of example methodologies for processing received P-SCH and S-SCH sequences, as well as scrambling codes according to aspects disclosed herein. Regarding example method 700, at act 710 a primary and a secondary synchronization sequence for a sector are received. Such synchronization sequences can be substantially any of the sequences generated in a base station according to an act such as 610 in example method 600. Additionally, such a PSC can be associated with a scrambling code (SC), wherein the association can be a one-to-one relationship. At act 720, the PSC can be decoded employing a correlator (e.g., correlator 268) in a mobile station (e.g., access terminal 260) and a set of code hypotheses which can be stored in memory (e.g., memory 285) in the mobile station. Decoding of the PSC also result in a determination of a sector identifier index associated with the PSC. At act 730 the SC is established according to the detected PSC index, which is the sector identifier. In an aspect, the PSC index can be employed as a key in a lookup table stored in a memory in the mobile station conducting the detection, the key providing access to a library of SCs also stored in the memory. At act 740, the received SSC is decoded. Such a decoding can employ a set of scrambling codes corresponding to a set of decoded PSCs. Operation related to unscrambling the SSC can be effected by a processor in the mobile station that receives the synchronization sequences.

In connection with example method 750, at act 760 a set of PSCs for a set of sectors and a concatenation indication are received, and at act 770 the set of PSCs is decoded and corresponding sector indices are determined. Decoding can proceed in substantially the same manner as in act 720. In act 780 a set of SCs associated with the PSC indices is established in the substantially the same fashion as in act 730. At act 790 a set of secondary synchronization sequences is generated by concatenating a subset of the established scrambling codes according to the received concatenation indication. Such an indication can identify specific SCs to be concatenated and the manner in which the concatenation can take place, e.g., sequentially or in an interleaved configuration. Operations associated with the concatenation and manipulation of SCs can be effected by a processor in the access terminal that receives the set of PSCs and the concatenation indication.

Figure 8:
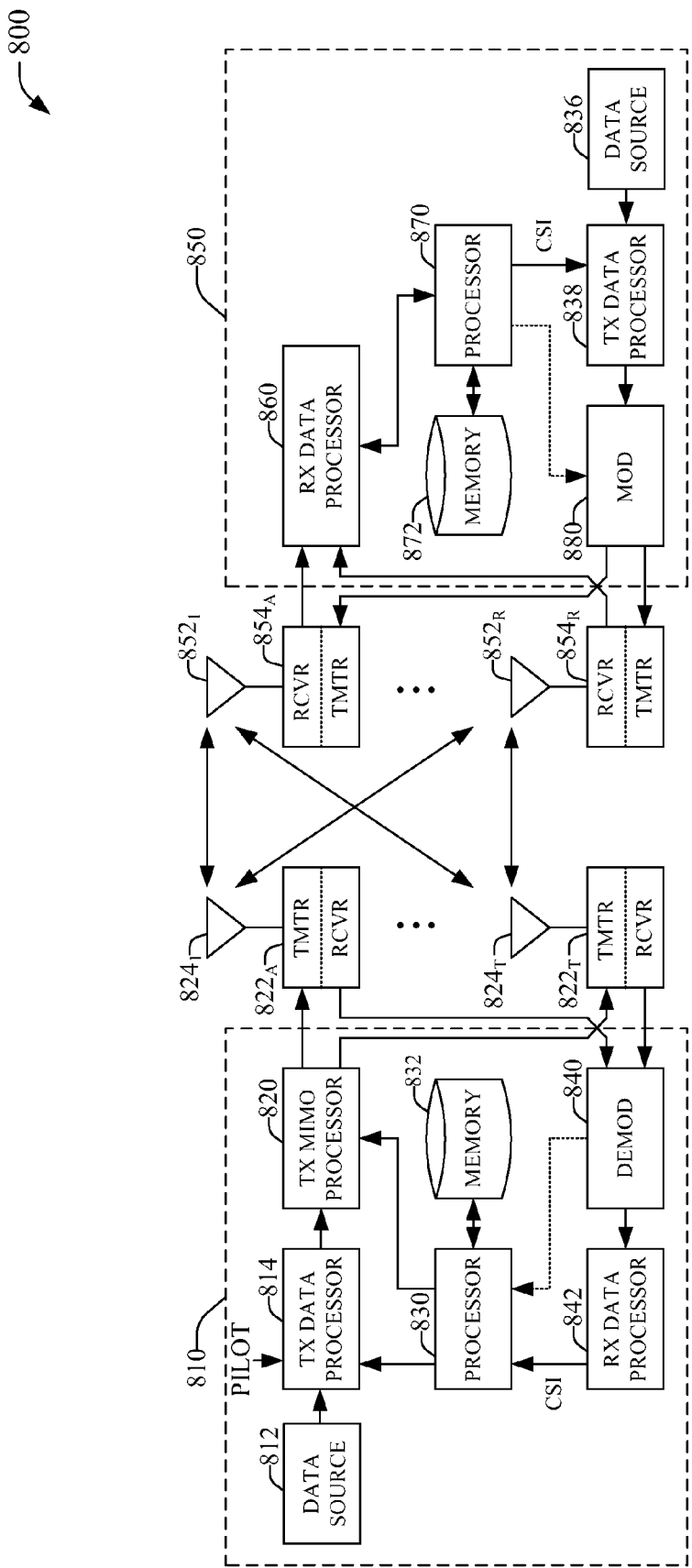
FIG. 8 is a block diagram of an embodiment of a transmitter system and a receiver system in a MIMO operation deployment that provide for cell/sector communication in accordance with aspects described in the subject description.

FIG. 8 is a block diagram 800 of an embodiment of a transmitter system 810 (such as node B 210, or base stations 110a, 110b, or 110c) and a receiver system 850 (e.g., access terminal 260) in a MIMO system that can provide for cell/sector communication in a wireless communication environment in accordance with one or more aspects set forth herein—e.g., generation, communication and decoding of synchronization sequences (e.g., P-SCH and S-SCH) can occur as described hereinbefore. At the transmitter system 810, traffic data for a number of data streams can be provided from a data source 812 to transmit (TX) data processor 814. In an embodiment, each data stream is transmitted over a respective transmit antenna. TX data processor 814 formats, codes, and interleaves the traffic data for each data stream based on a particular coding scheme selected for that data stream to provide coded data. The coded data for each data stream may be multiplexed with pilot data using OFDM techniques. The pilot data is typically a known data pattern that is processed in a known manner and can be used at the receiver system to estimate the channel response. The multiplexed pilot and coded data for each data stream is then modulated (e.g., symbol mapped) based on a particular modulation scheme (e.g., binary phase-shift keying (BPSK), quadrature phase-shift keying (QPSK), multiple phase-shift keying (M-PSK), or M-ary quadrature amplitude modulation (M-QAM)) selected for that data stream to provide modulation symbols. The data rate, coding, and modulation for each data stream may be determined by instructions executed by processor 830, the instructions as well as the data may be stored in memory 832.

The modulation symbols for all data streams are then provided to a TX MIMO processor 820, which may further process the modulation symbols (e.g., OFDM). TX MIMO processor 820 then provides $N_T$ modulation symbol streams to $N_T$ transceiver (TMTR/RCVR) $822_A$ through $822_T$. In certain embodiments, TX MIMO processor 820 applies beamforming weights (or precoding) to the symbols of the data streams and to the antenna from which the symbol is being transmitted. Each transceiver 822 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers $822_A$ through $822_T$ are then transmitted from $N_T$ antennas $824_1$ through $824_T$, respectively. At receiver system 850, the transmitted modulated signals are received by $N_R$ antennas $852_1$ through $852_R$ and the received signal from each antenna 852 is provided to a respective transceiver (RCVR/TMTR) $854_A$ through $854_R$. Each transceiver $854_1$-$854_R$ conditions (e.g., filters, amplifies, and downconverts) a respective received signal, digitizes the conditioned signal to provide samples, and further processes the samples to provide a corresponding "received" symbol stream.

An RX data processor 860 then receives and processes the $N_R$ received symbol streams from $N_R$ transceivers $854_1$-$854_R$ based on a particular receiver processing technique to provide $N_T$ "detected" symbol streams. The RX data processor 860 then demodulates, deinterleaves, and decodes each detected symbol stream to recover the traffic data for the data stream. The processing by RX data processor 860 is complementary to that performed by TX MIMO processor 820 and TX data processor 814 at transmitter system 810. A processor 870 periodically determines which pre-coding matrix to use, such a matrix can be stored in memory 872. Processor 870 formulates a reverse link message comprising a matrix index portion and a rank value portion. Memory 872 may store instructions that when executed by processor 870 result in formulating the reverse link message. The reverse link message may comprise various types of information regarding the communication link or the received data stream, or a combination thereof. As an example, such information can comprise an adjusted communication resource, an offset for adjusting a scheduled resource, and information for decoding a data packet format. The reverse link message is then processed by a TX data processor 838, which also receives traffic data for a number of data streams from a data source 836, modulated by a modulator 880, conditioned by transceiver $854_A$ through $854_R$, and transmitted back to transmitter system 810.

At transmitter system 810, the modulated signals from receiver system 850 are received by antennas $824_1$-$824_T$, conditioned by transceivers $822_A$-$822_T$, demodulated by a demodulator 840, and processed by a RX data processor 842 to extract the reserve link message transmitted by the receiver system 850. Processor 830 then determines which pre-coding matrix to use for determining the beamforming weights and processes the extracted message.

Single-user (SU) MIMO mode of operation corresponds to the case in which a single receiver system 850 communicates with transmitter system 810, as illustrated in FIG. 8 and according to the operation described above. It should be appreciated that in the subject mode of operation inter-cell power can be effected as described hereinbefore. In a SU-MIMO system, the $N_T$ transmitters $824_1$-$824_T$ (also known as TX antennas) and $N_R$ receivers $852_1$-$852_R$ (also known as RX antennas) form a matrix channel (e.g., Rayleigh channel, or Gaussian channel) for wireless communication. The SU-MIMO channel is generally described by a $N_R \times N_T$ matrix of random complex numbers. The rank of the channel equals the algebraic rank of the $N_R \times N_T$ channel. In space-time or space-frequency coding, the rank equals the number of data streams, or layers, that are sent over the channel. It should be appreciated that the rank is at most equal to $\min\{N_T, N_R\}$. A MIMO channel formed by the $N_T$ transmit and $N_R$ receive antennas may be decomposed into $N_V$ independent channels, which are also referred to as spatial channels, where $N_V \leq \min\{N_T, NR\}$ Each of the $N_V$ independent channels corresponds to a dimension or communication layer. Synchronization channel generator 215 can map a generated sequence, after modulation thereof, into the $N_V$ communication layers in which the MIMO channel can be decomposed. Processor 225 can perform a portion of the mapping.

In one aspect, transmitted/received symbols with OFDM, at tone ω, can be modeled by:

$$y(\omega)=H(\omega)c(\omega)+n(\omega). \qquad (1)$$

Here, y(ω) is the received data stream and is a $N_R \times 1$ vector, H(ω) is the channel response $N_R \times N_T$ matrix at tone ω (e.g., the Fourier transform of the time-dependent channel response matrix h), c(ω) is an $N_T \times 1$ output symbol vector, and n(ω) is an $N_R \times 1$ noise vector (e.g., additive white Gaussian noise). Precoding can convert a $N_V \times 1$ layer vector to $N_T \times 1$ precoding output vector. $N_V$ is the actual number of data streams (layers) transmitted by transmitter 810, and $N_V$ can be scheduled at the discretion of the transmitter (e.g., access point 250) based at least in part on channel conditions and the rank reported by the terminal. It should be appreciated that c(ω) is the result of at least one multiplexing scheme, and at least one pre-coding (or beamforming) scheme applied by the transmitter. Additionally, c(ω) is convoluted with a power gain matrix, which determines the amount of power transmitter 810 allocates to transmit each data stream $N_V$. It should be appreciated that such a power gain matrix can be a resource that is assigned to access terminal 240, and it can be managed through adjustment of power offsets as described herein. In view of the FL/RL reciprocity of the wireless channel, it should be appreciated that a transmission from MIMO receiver 850 can also be modeled in the fashion of Eq. (1), including substantially the same elements. In addition, receiver 850 can also apply pre-coding schemes prior to transmitting data in the reverse link. It should be appreciated that generation of a PSC (e.g., $320_1$, $320_2$, or $320_3$) or SSC (e.g., $330_1$, $330_2$, or $330_3$) precedes mapping of the generated sequence into an OFDM time-frequency resource block. As mentioned above, synchronization channel generator 215 can map a generated sequence, which can be conveyed in the manner described above.

In system 800 (FIG. 8), when $N_T=N_R=1$, the system reduces to a single-input single-output (SISO) system that can provide for sector communication in a wireless communication environment in accordance with one or more aspects set forth herein. Alternatively, a single-input multiple output (SIMO) mode of operation corresponds to $N_T>1$ and $N_R=1$. Furthermore, when multiple receivers communicate with transmitter system 810, a multiuser (MU) MIMO mode of operation is established.

Next, systems that can enable aspects of the disclosed subjected matter are described in connection with FIGS. 9 and 10. Such systems can include functional blocks, which can be functional blocks that represent functions implemented by a processor or an electronic machine, software, or combination thereof (e.g., firmware).

Figure 9:
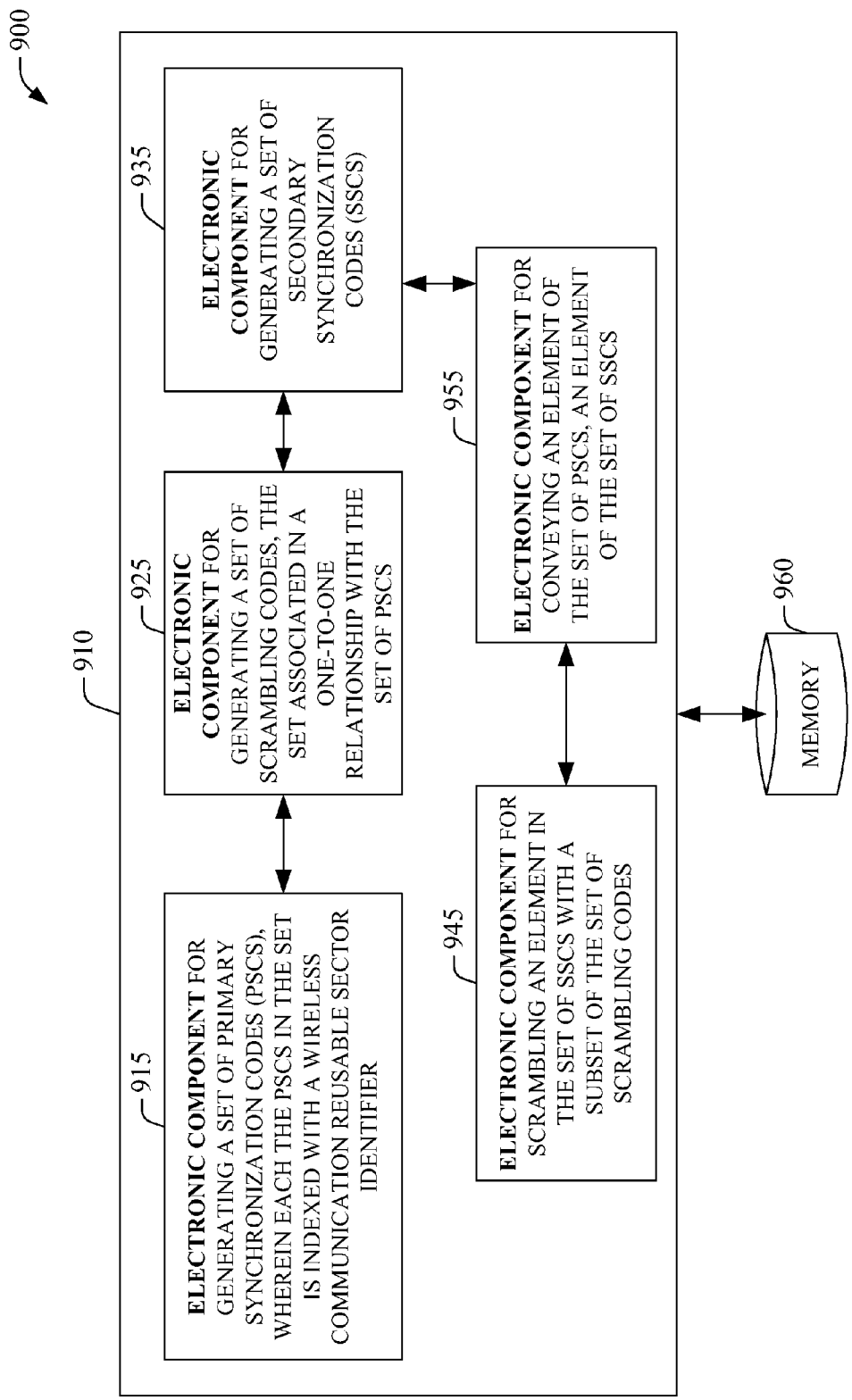
FIG. 9 illustrates a block diagram of an example system that enables generating, scrambling, and conveying primary and secondary synchronization channels in accordance with aspects of the subject disclosure.

FIG. 9 illustrates a block diagram 900 of an example system that enables generating, scrambling, and conveying primary and secondary synchronization channels in accordance with aspects of the subject disclosure. System 900 can reside, at least partially, within a wireless mobile station (e.g., node B 210). System 900 includes a logical grouping 1010 of electronic components that can act in conjunction. In an aspect, logical grouping 1010 includes an electronic component 915 for generating a set of primary synchronization codes (PSCs), wherein each the PSCs in the set is indexed with a wireless communication reusable sector identifier; an electronic component 925 for generating a set of scrambling codes, the set associated in a one-to-one relationship with the set of PSCs; an electronic component 935 for generating a set of secondary synchronization codes (SSCs); an electronic component 945 for scrambling an element in the set of SSCs with a subset of the set of scrambling codes; an electronic component 955 for conveying an element of the set of PSCs, an element of the set of SSCs.

System 900 can also include a memory 960 that retains instructions for executing functions associated with electronic components 915, 925, 935, 945, and 1055, as well as measured and computed data that may be generated during executing such functions. While shown as being external to memory 960, it is to be understood that one or more of electronic components 915, 925, 935, 945 and 955 can exist within memory 960.

Figure 10:
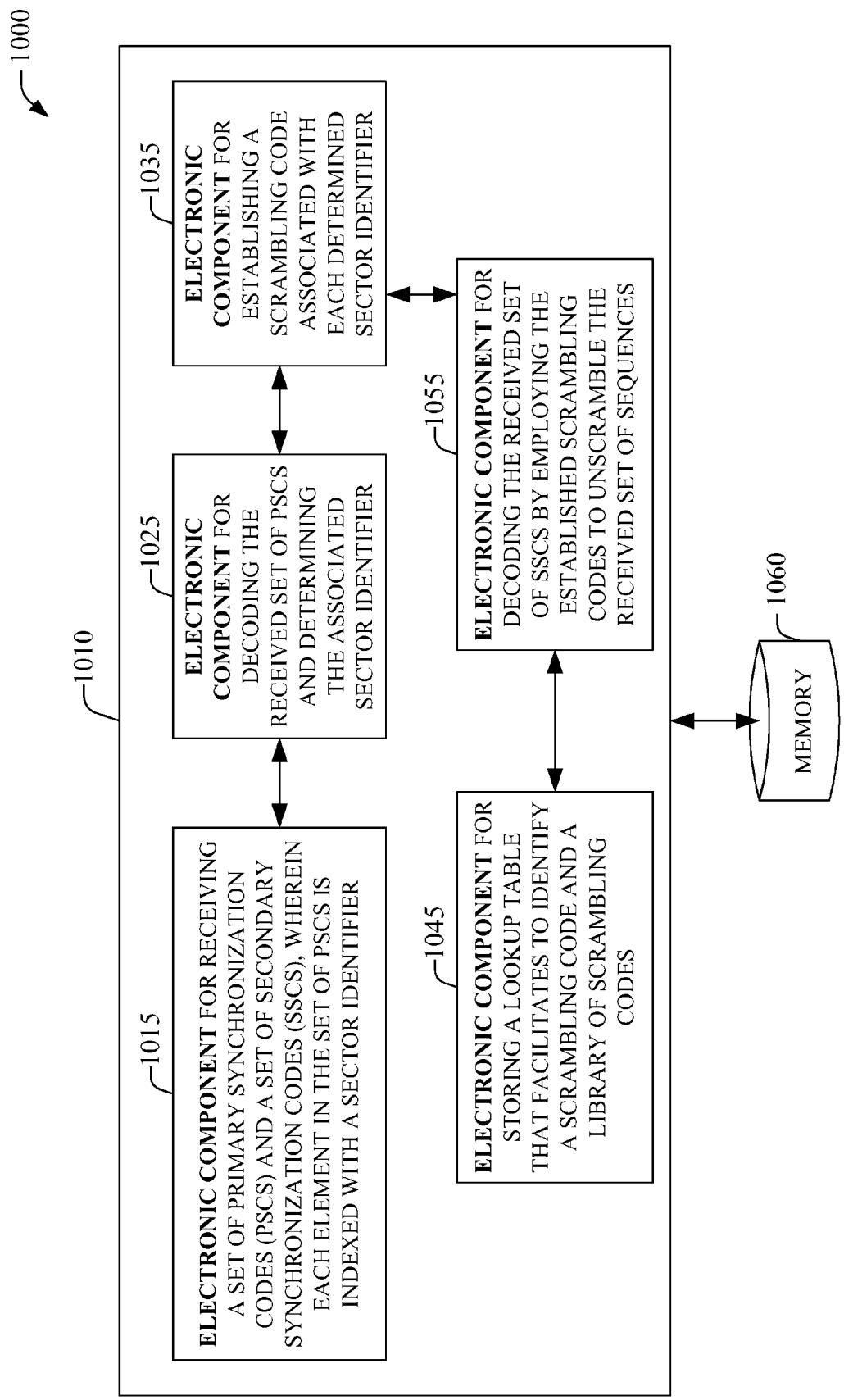
FIG. 10 illustrates a block diagram of an example system that enables receiving and decoding primary and secondary synchronization channel sequences in accordance with aspects of the subject disclosure.

FIG. 10 illustrates a block diagram 1000 of an example system that enables receiving and decoding primary and secondary synchronization channel in accordance with aspects of the subject disclosure. System 1000 can reside, at least partially, within a wireless base station (e.g., access terminal 260). System 1000 includes a logical grouping 1010 of electronic components that can act in conjunction. In an aspect, logical grouping 1010 includes an electronic component 1415 for receiving a set of primary synchronization codes (PSCs) and a set of secondary synchronization codes (SSCs), wherein each element in the set of PSCs is indexed with a sector identifier; an electronic component 1025 for decoding the received set of PSCs and determining the associated sector identifier; and an electronic component 1035 for establishing a scrambling code associated with each determined sector identifier; an electronic component 1045 for decoding the received set of SSCs by employing the established scrambling codes to unscramble the received set of sequences; and an electronic component for storing a lookup table that facilitates to identify a scrambling code and a library of scrambling codes.

System 1000 can also include a memory 1060 that retains instructions for executing functions associated with electronic components 1015, 1025, 1035, 1045, and 1055, as well as measured and computed data that may be generated during executing such functions. While shown as being external to memory 1060, it is to be understood that one or more of electronic components 1015, 1025, 1035, 1045 and 1055 can exist within memory 1060.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

As it employed herein, the term "processor" can refer to a classical architecture or a quantum computer. Classical architecture is intended to comprise, but is not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Quantum computer architecture may be based on qubits embodied in gated or self-assembled quantum dots, nuclear magnetic resonance platforms, superconducting Josephson junctions, etc. Processors can exploit nano-scale architectures such as, but not limited to, molecular and quantum-dot based transistors, switches and gates, in order to optimize space usage or enhance performance of user equipment. A processor may also be implemented as a combination of computing devices, e.g., a combination of a DSP and a microprocessor, a plurality of microprocessors, one or more microprocessors in conjunction with a DSP core, or any other such configuration.

Furthermore, in the subject specification, the term "memory" refers to data stores, algorithm stores, and other information stores such as, but not limited to, image store, digital music and video store, charts and databases. It will be appreciated that the memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to, these and any other suitable types of memory.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes," "including," "posses," "possessing," or variants thereof are used in either the detailed description or the claims, such terms are intended to be inclusive in a manner similar to the term "comprising" as "comprising" is interpreted when employed as a transitional word in a claim.

What is claimed is:

1. A method for generating synchronization channels in a wireless communication system, the method comprising:
   generating a set of primary synchronization channel (P-SCH) sequences;
   generating an association among the generated set of primary synchronization sequences and a set of scrambling codes;generating a set of secondary synchronization channel sequences (S-SCH); and
   scrambling each element in the set of S-SCH sequences with the set of scrambling codes.

2. The method of claim 1, wherein each element in the set of P-SCH sequences is identified with a sector index.

3. The method of claim 1, wherein the association among the generated set of P-SCH sequences and the set of scrambling codes is a one-to-one relationship.

4. The method of claim 1, wherein generating a set of P-SCH sequences comprises generating an element in the set by applying a sign-flip operation to a base sequence.

5. The method of claim 1, wherein generating a set of P-SCH sequences comprises generating an element in the set by applying a conjugate cyclic shift to a base sequence.

6. The method of claim 1, wherein generating a set of S-SCH sequences comprises generating an element in the set by applying a sign-flip operation to a base sequence.

7. The method of claim 1, wherein generating a set of S-SCH sequences comprises generating an element in the set by applying a conjugate cyclic shift to a base sequence.

8. The method of claim 1, further comprising issuing a concatenation indication for concatenating two or more elements in a set of sequences associated with the set of P-SCH sequences to generate a set of S-SCH sequences.

9. The method of claim 8, the generated set of S-SCH sequences comprising unscrambled sequences.

10. The method of claim 8, wherein concatenating two or more elements in the set of sequences associated with the set of P-SCH sequences to generate a set of S-SCH sequences includes:performing the concatenation sequentially; and effecting a cyclic shift of the scrambling sequences sequentially concatenated.

11. The method of claim 8, wherein concatenating two or more elements in the set of sequences associated with the set of P-SCH sequences to generate a set of S-SCH sequences includes an interleaved concatenation.

12. The method of claim 1, wherein the set of P-SCH sequences comprises at least one of a Walsh-Hadamard sequence, a Gold sequence, a Rice sequence, a Golomb sequence, an M-sequence, a pseudonoise sequence, or a generalized Chirp-like sequence.

13. The method of claim 1, wherein the set of scrambling sequences comprises at least one of a Walsh-Hadamard sequence, a Gold sequence, a Rice sequence, a Golomb sequence, an M-sequence, a pseudonoise sequence, or a generalized Chirp-like sequence.

14. The method of claim 8, wherein the set of sequences comprises at least one of a Walsh-Hadamard sequence, a Gold sequence, a Rice sequence, a Golomb sequence, an M-sequence, a pseudonoise sequence, or a generalized Chirp-like sequence.

15. The method of claim 1, wherein the set of S-SCH sequences comprises at least one of a Walsh-Hadamard sequence, a Gold sequence, a Rice sequence, a Golomb sequence, an M-sequence, a pseudonoise sequence, or a generalized Chirp-like sequence.

16. The method of claim 1, further comprising generating the set of scrambling sequences.

17. The method of claim 16, wherein generating the set of scrambling codes comprises generating an element in the set by applying a sign-flip operation to a base sequence.

18. The method of claim 16, wherein generating the set of scrambling codes comprises generating an element in the set by applying a conjugate cyclic shift to a base sequence.

19. The method of claim 10, further comprising conveying the issued concatenation indication.

20. The method of claim 1, further comprising conveying at least an element in the set of P-SCH sequences.

21. The method of claim 1, further comprising conveying at least an element in the set of S-SCH sequences.

22. An apparatus that operates in a wireless communication system, the apparatus comprising:
   a processor configured to generate a set of primary synchronization channel (P-SCH) sequence, to generate a set of scrambling codes and associate each element in the set to an element in the set of P-SCH sequences; to generate a set of secondary synchronization channels, and to scramble at least one element in the set of S-SCH with the generated set of scrambling codes; anda memory coupled to the processor.

23. The apparatus of claim 22, wherein each element in the set of P-SCH sequences is identified with a sector index.

24. The apparatus of claim 22, the processor further configured to generate a concatenation indication, wherein the concatenation indication conveys a concatenation protocol to combine two or more sequences in a set of sequences associated with the set of P-SCH sequences to form a S-SCH sequence.

25. The apparatus of claim 24, wherein the concatenation protocol comprises at least one of a sequential concatenation of the two or more sequences or an interleaved concatenation.

26. The apparatus of claim 25, wherein the concatenation protocol further comprises at least one of a cyclic left-shift or a cyclic right-shift of the two or more sequences.

27. The apparatus of claim 22, wherein the set of P-SCH sequences comprises at least one of a Walsh-Hadamard sequence, a Gold sequence, a Rice sequence, a Golomb sequence, an M-sequence, a pseudonoise sequence, or a generalized Chirp-like sequence.

28. The apparatus of claim 22, wherein the set of S-SCH sequences comprises at least one of a Walsh-Hadamard sequence, a Gold sequence, a Rice sequence, a Golomb sequence, an M-sequence, a pseudonoise sequence, or a generalized Chirp-like sequence.

29. The apparatus of claim 22, wherein the set of scrambling sequences comprises at least one of a Walsh-Hadamard sequence, a Gold sequence, a Rice sequence, a Golomb sequence, an M-sequence, a pseudonoise sequence, or a generalized Chirp-like sequence.

30. The apparatus of claim 24, wherein the set of sequences associated with the set of P-SCH sequences comprises at least one of a Walsh-Hadamard sequence, a Gold sequence, a Rice sequence, a Golomb sequence, an M-sequence, a pseudonoise sequence, or a generalized Chirp-like sequence.

31. The apparatus of claim 26, the processor further configured to convey the generated concatenation indication.

32. The apparatus of claim 22, the processor further configured to convey at least one of an element of the set of P-SCH sequences or an element of the set of S-SCH sequences.

33. A computer program product, including a non-transitory computer-readable medium comprising:
   code for causing a computer to generate a set of primary synchronization channel (P-SCH) sequences, each element in the set of P-SCH sequences is identified with a reusable communication sector index;

code for causing a computer to generate a one-to-one association among the generated set of primary synchronization sequences and a set of scrambling codes;

code for causing a computer to generate a set of secondary synchronization channel sequences (S-SCH); and code for causing a computer to scramble each element in the set of S-SCH sequences with the set of scrambling codes.

34. The computer program product of claim 33, further comprising code for causing a computer to issue a concatenation indication, wherein the concatenation indication conveys a concatenation protocol to combine two or more sequences associated with a set of P-SCH sequences to form a S-SCH sequence.

35. The computer program of claim 34, further comprising code for causing a computer to execute concatenation protocol, wherein the concatenation protocol includes:
performing the concatenation sequentially; and
effecting a cyclic shift of the two or more sequences sequentially concatenated.

36. A wireless communication device comprising:
means for generating a set of primary synchronization codes (PSCs), wherein each the PSCs in the set is indexed with a wireless communication reusable sector identifier;
means for generating a set of scrambling codes, the set associated in a one-to-one relationship with the set of PSCs;
means for generating a set of secondary synchronization codes (SSCs); means for scrambling an element in the set of SSCs with a subset of the set of scrambling codes; and
means for conveying an element of the set of PSCs, an element of the set of SSCs.

37. A method for processing synchronization channels transmitted in a wireless communication environment, the method comprising:
receiving a set of primary synchronization channel (P-SCH) sequences and a set of secondary synchronization channel (S-SCH) sequences, wherein each element in the set of P-SCH sequences is indexed with a sector identifier;
decoding the received set of P-SCH sequences and determining the associated sector identifier;
establishing a scrambling code associated with each determined sector identifier; and
decoding the received set of S-SCH sequences by employing the established scrambling codes to unscramble the received set of sequences.

38. The method of claim 37, wherein establishing a scrambling code associated with each determined sector identifier comprises employing said identifier as a key to a lookup table that reveals a one-to-one association among a P-SCH sequence and a scrambling code.

39. The method of claim 38, further comprising employing the key to the lookup table to extract the scrambling code from a scrambling code library.

40. The method of claim 37, further comprising receiving a S-SCH concatenation indication, the concatenation indication conveys a concatenation protocol to generate a secondary synchronization sequence by concatenating two or more sequences in a set of sequences that present a one-to-one relationship with a set of P-SCH sequences.

41. The method of claim 40, wherein the received concatenation protocol comprises:
performing the concatenation sequentially; and
effecting a cyclic shift of the two or more sequences sequentially concatenated.

42. The method of claim 40, wherein the received concatenation protocol comprises performing an interleaved concatenation.

43. The method of claim 40, the set of P-SCH sequences comprising at least one of a Walsh-Hadamard sequence, a Gold sequence, a Rice sequence, a Golomb sequence, an M-sequence, a pseudonoise sequence, or a generalized Chirp-like sequence.

44. The method of claim 40, the set of S-SCH sequences comprising at least one of a Walsh-Hadamard sequence, a Gold sequence, a Rice sequence, a Golomb sequence, an M-sequence, a pseudonoise sequence, or a generalized Chirp-like sequence.

45. The method of claim 40, the established scrambling code comprising at least one of a Walsh-Hadamard sequence, a Gold sequence, a Rice sequence, a Golomb sequence, an M-sequence, a pseudonoise sequence, or a generalized Chirp-like sequence.

46. The method of claim 40, a sequence in the set of sequences that present a one-to-one relationship with a set of P-SCH sequences comprising at least one of a Walsh-Hadamard sequence, a Gold sequence, a Rice sequence, a Golomb sequence, an M-sequence, a pseudonoise sequence, or a generalized Chirp-like sequence.

47. A computer program product, including a non-transitory computer-readable medium comprising:
code for causing a computer to receive a set of primary synchronization channel (P-SCH) sequences and a set of secondary synchronization channel (S-SCH) sequences, wherein each element in the set of P-SCH sequences is indexed with a sector identifier;
code for causing a computer to decode the received set of P-SCH sequences and determining the associated sector identifier;
code for causing a computer to establish a scrambling code associated with each determined sector identifier; and
code for causing a computer to decode the received set of S-SCH sequences by employing the established scrambling codes to unscramble the received set of sequences.

48. A wireless communication device comprising:
a processor configured to receive a set of primary synchronization channel (P-SCH) sequences and a set of secondary synchronization channel (S-SCH) sequences, wherein each element in the set of P-SCH sequences is indexed with a sector identifier;
to decode the received set of P-SCH sequences and determining the associated sector identifier;
to establish a scrambling code associated with each determined sector identifier; and
to decode the received set of S-SCH sequences by employing the established scrambling codes to unscramble the received set of sequences; and a memory coupled to the processor.

49. The wireless communication device of claim 48, the processor further configured to receive a S-SCH concatenation indication, wherein the concatenation indication conveys a concatenation protocol to generate a secondary synchronization sequence by sequential or interleaved concatenation two or more of the established scrambling codes.

50. The wireless communication device of claim 48, further comprising a lookup table stored in the memory coupled to the processor, the lookup table facilitates to identify a scrambling code.

51. The wireless communication device of claim 48, further comprising a library of scrambling codes stored in the memory coupled to the processor.

52. The wireless communication device of claim 48, the set of P-SCH sequences comprising at least one of a Walsh-Hadamard sequence, a Gold sequence, a Rice sequence, a Golomb sequence, an M-sequence, a pseudonoise sequence, or a generalized Chirp-like sequence.

53. The wireless communication of claim 48, the set of S-SCH sequences comprising at least one of a Walsh-Hadamard sequence, a Gold sequence, a Rice sequence, a Golomb sequence, an M-sequence, a pseudonoise sequence, or a generalized Chirp-like sequence.

54. The wireless communication device of claim 48, wherein the established scrambling code comprising at least one of a Walsh-Hadamard sequence, a Gold sequence, a Rice sequence, a Golomb sequence, an M-sequence, a pseudonoise sequence, or a generalized Chirp-like sequence.

55. An apparatus that operates in a wireless environment, the apparatus comprising:
- means for receiving a set of primary synchronization codes (PSCs) and a set of secondary synchronization codes (SSCs), wherein each element in the set of PSCs is indexed with a sector identifier;means for decoding the received set of PSCs and determining the associated sector identifier;
- means for establishing a scrambling code associated with each determined sector identifier;means for decoding the received set of SSCs by employing the established scrambling codes to unscramble the received set of sequences; and
- means for storing a lookup table that facilitates to identify a scrambling code and a library of scrambling codes.

* * * * *